United States Patent [19]

van der Schoot

[11] Patent Number: 4,553,661
[45] Date of Patent: Nov. 19, 1985

[54] APPARATUS FOR HORIZONTALLY AND VERTICALLY TRANSPORTING EGGS WITHOUT DROPPING THEREOF

[75] Inventor: Jelle van der Schoot, Aalten, Netherlands

[73] Assignee: Staalkat B.V., Aalten, Netherlands

[21] Appl. No.: 552,739

[22] Filed: Nov. 17, 1983

[30] Foreign Application Priority Data

Nov. 24, 1982 [NL] Netherlands ............... 8204580

[51] Int. Cl.$^4$ ............................................. B65G 47/26
[52] U.S. Cl. .............................. 198/428; 198/468.29; 53/248; 294/64.1
[58] Field of Search ............... 198/482, 378, 653, 689, 198/479, 424, 426, 427, 428, 429, 484, 486, 488, 705, 409, 485; 294/2, 64 R, 87 A; 53/247, 248, 258, 261

[56] References Cited

U.S. PATENT DOCUMENTS

| | | | |
|---|---|---|---|
| 1,987,336 | 1/1935 | Powell | 198/689 X |
| 2,648,419 | 8/1953 | Detrez | 198/485 X |
| 2,989,168 | 6/1961 | Mumma | 198/653 |
| 3,040,869 | 6/1962 | Mumma | 198/653 X |
| 3,327,453 | 6/1967 | Willbrandt et al. | 198/485 X |
| 3,370,692 | 2/1968 | Mosterd | 198/484 X |
| 3,528,572 | 9/1970 | Mosterd | 198/653 X |
| 3,542,224 | 11/1970 | Warren | 294/87 A |
| 3,637,249 | 1/1972 | Kuhl et al. | 294/64.1 |
| 3,894,631 | 7/1975 | Rose et al. | 198/378 |

FOREIGN PATENT DOCUMENTS

| | | | |
|---|---|---|---|
| 2440477 | 3/1975 | Fed. Rep. of Germany | 198/653 |
| 2716904 | 11/1977 | Fed. Rep. of Germany | |
| 1521765 | 5/1967 | France | |
| 6410613 | 3/1966 | Netherlands | |
| 6717724 | 12/1967 | Netherlands | 198/485 |
| 966330 | 8/1964 | United Kingdom | |

Primary Examiner—Joseph E. Valenza
Assistant Examiner—Jonathan D. Holmes
Attorney, Agent, or Firm—Scully, Scott, Murphy & Presser

[57] ABSTRACT

Apparatus for horizontally and vertically transporting articles, such as eggs, without dropping thereof, in which an intermittently, substantially horizontally movable conveyor is provided with a plurality of holders, each designed to hold a single article. Each holder comprises at least two rotary portions, movable between a closed position in which it supports an article and an open position in which it releases an article. The conveyor transports the articles, while the holders are in closed positions, into a transfer station which is provided with a plurality grippers, such as suction cups, one for each associated holder in the transfer station. Each gripper grips an article in an associated holder, while the holder is in a closed position, and after the holder is opened, the gripper transports the article vertically downwardly, through the opened rotary portions of the holder, to minimize dropping thereof, after which the article is released.

4 Claims, 7 Drawing Figures

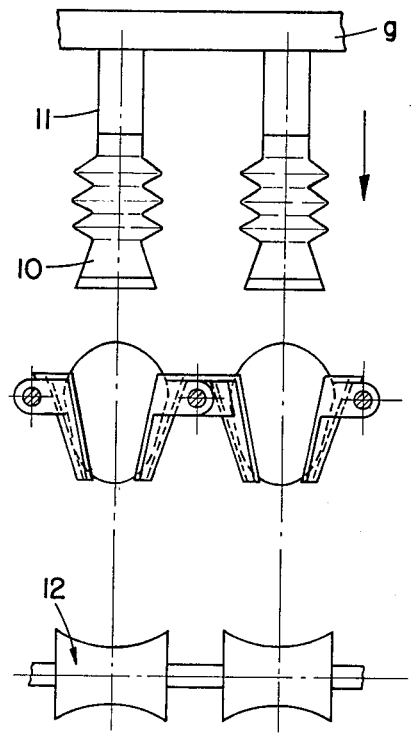
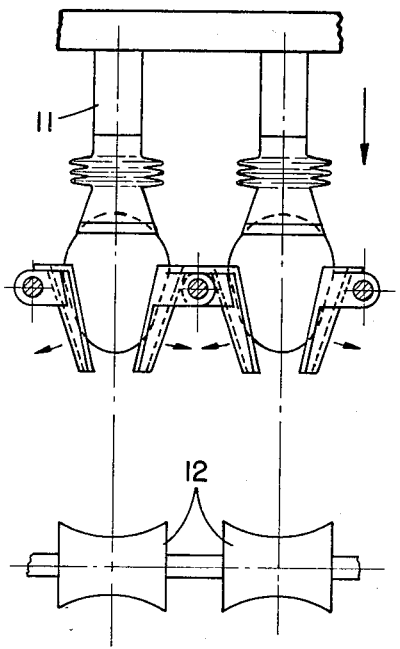
FIG.1a  FIG.1b
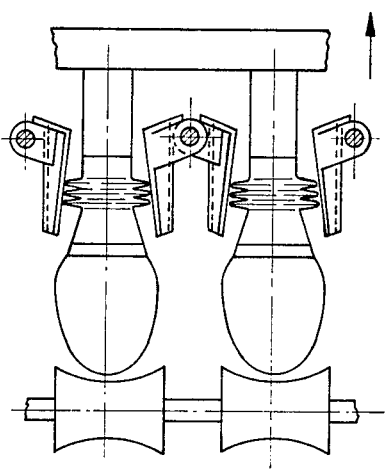
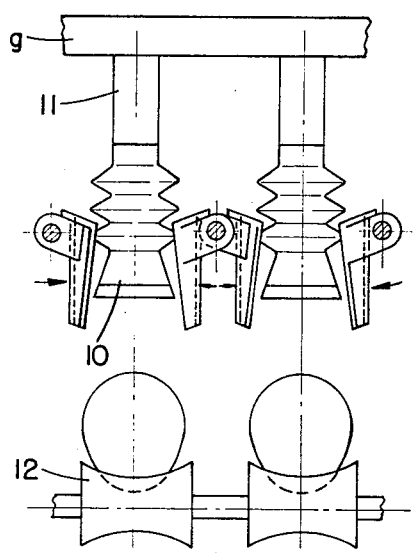
FIG.1c  FIG.1d

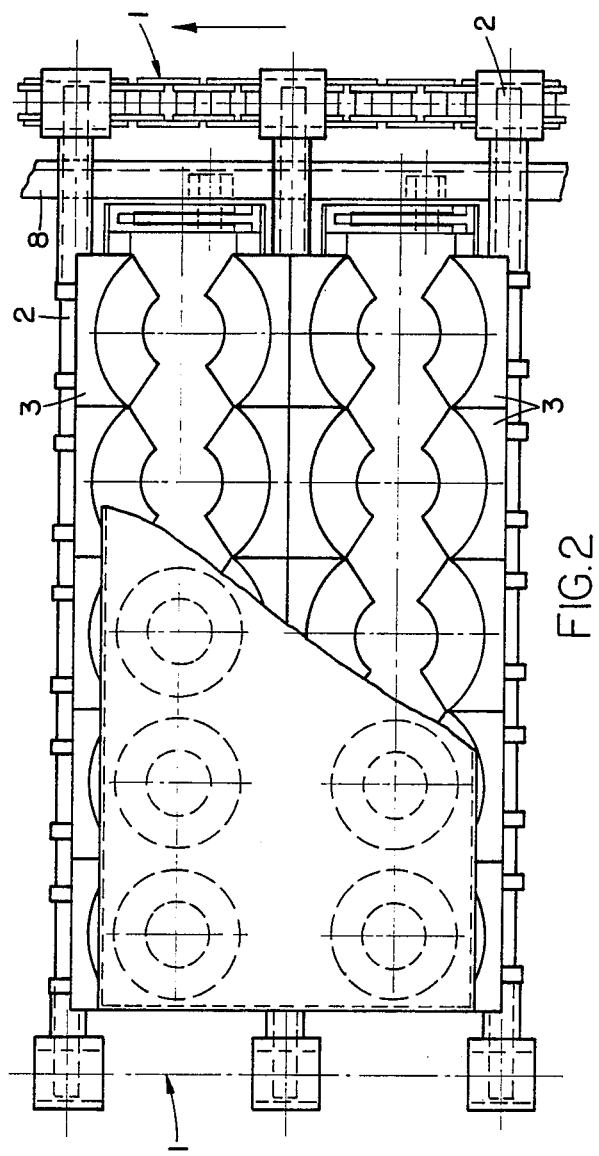
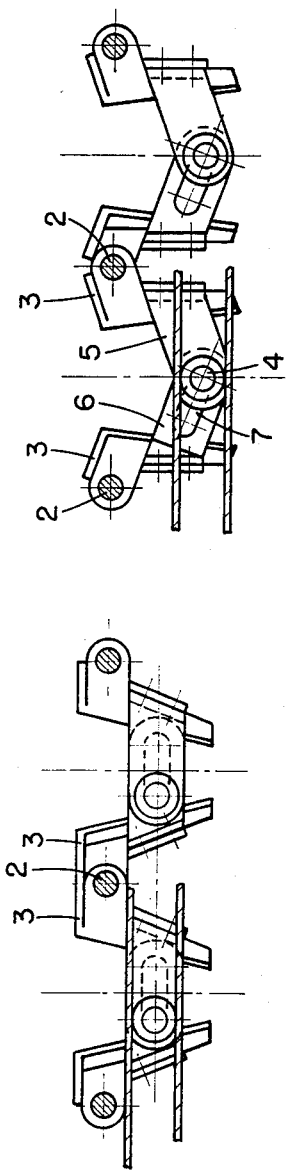

APPARATUS FOR HORIZONTALLY AND VERTICALLY TRANSPORTING EGGS WITHOUT DROPPING THEREOF

The invention relates to an apparatus for transporting articles, such as eggs, comprising a conveyor means having a plurality of holders, each consisting of at least two portions.

When the articles are deposited from such holders received in a conveyor means, these are commonly subject to a, be it small, free fall (see e.g. U.S. Pat. No. 2,989,168).

It is an object of the invention to eliminate this drawback and to this end provides an apparatus of the above kind, characterized by means for transporting the articles from the said holders substantially vertically downwardly at a transfer location.

At the transfer location, there may be provided above each holder a substantially vertically movable suction cup or the like, with the holder portions and the suction cup being adapted in such a manner that the latter can be moved between the holder portions in the opened position thereof. This arrangement enables the articles to be discharged downwardly from the holder, and prevents a free fall of the article by engaging the article with a suction cup just before the holder is opened, and to deposit the same, carried by the suction cup, at a subjacent level.

In a further embodiment of the invention, the two opposing portions of successive holders may be mounted on one and the same shaft, thus minimizing the number of parts. Moreover, it is achieved by the closely adjacent disposition of the holders that the pitch of the intermittently moved conveyor chain can be kept smaller, resulting in a quieter transport.

Furthermore, the two halves of each holder may be interconnected by means of a slotted plate attached to the one holder portion and a pin extending therethrough and connected to the other holder portion, said pin being movable downwardly at the transfer location by means of a movable portion of a guide beam attached to the frame of the apparatus.

One embodiment of the transport apparatus according to the invention will now be described, by way of example, with reference to the accompanying drawings, in which:

FIGS. 1a–1d diagrammatically show the major parts of a transport apparatus each time in a different position;

FIG. 2 is a partial cross-sectional top view of the conveyor chain accommodating holders employed in the transport apparatuses according to the invention;

FIG. 3 is a reduced diagrammatic view on the line III—III of FIG. 2; and

FIG. 4 is a view according to FIG. 3, but with the parts in a different position.

As shown in the drawings, an apparatus for transporting articles, such as eggs, comprises two conveyor chains 1. The conveyor chains are interconnected by means of shafts 2, on each of which are mounted a plurality of holder halves 3. As shown in the drawings, the opposing halves of two successive holders are mounted on a single shaft 2. The holder portions which jointly form a single holder are interconnected by means of their lip 5 attached to the one holder half and a fork-shaped member 6 attached to the other holder half and fitted with a slot 7, and by pin 4 passing through an aperture in the said lip and the slot 7. The one end of the pin 4 is received in a guide beam 8 attached to the frame, not shown. The guide beam comprises a vertically movable portion at the transfer location.

Referring more in particular to FIG. 1, at the transfer location above the conveyor chain, there is disposed in a manner not further shown, a vertically movable suction box 9 having a plurality of suction cups 10 attached thereto by means of connection tubes 11. Such a suction box with suction cups is described e.g. in U.S. Pat. No. 3,061,352. Underneath the conveyor chain, at the said transfer location, there is provided a known per se conveyor 12, consisting of rollers, as described for instance in U.S. Pat. No. 3,120,889.

FIG. 1a shows the above described position wherein the conveyor chain with the holders has just been arrested and the suction box with the cups 10 is moved downwardly. In the position shown in FIG. 1b, the suction of the eggs by the suction cup and the subsequent opening of the holder portions is initiated. In the position shown in FIG. 1c, the suction cups with the articles held thereby are moved between the opened holder portions in downward direction until the articles reach the conveyor 12. After this, the partial vacuum in the suction box is removed and the suction box with the suction cups is moved upwardly (FIG. 1d), after which the cycle can recommence.

It will be clear that a great many modifications are possible within the scope of the invention.

What I claim is:

1. Apparatus for horizontally and vertically transporting articles, such as eggs, without dropping thereof, comprising:
   a. an intermittently substantially horizontally movable conveyor means having a plurality of holders, each designed to hold a single article, and each holder comprising at least two rotary portions, movable between a position in which it supports an article and an open position in which it releases an article; and
   b. a transfer station into which said conveyor means transports the articles while the holders are in closed positions, said transfer station including a plurality of gripping means, one for each associated holder in the transfer station, each gripping means gripping an article in a holder, while the holder is in a closed position, and after the holder is opened, each gripping means transporting the article substantially vertically downwardly through opened rotary portions of the associated holder, to minimize dropping and possible breakage of the article.

2. Apparatus according to claim 1, wherein each gripping means includes a substantially vertically movable suction cup, with the holder rotary portions and the suction cup being arranged such that the suction cup is movable between the holder portions in opened position thereof.

3. Apparatus according to claim 2, wherein two rotary positions of successive holders are mounted on one common shaft.

4. Apparatus according to claim 3, wherein the two rotary portions of each holder are interconnected by a slotted plate attached to one holder rotary portion and a pin extending therethrough and connected to the other holder portion, said pin, at the transfer station, being movable downwardly by means of a movable portion of a guide beam attached to the frame of the apparatus.

* * * * *